(12) United States Patent
Vulpitta et al.

(10) Patent No.: US 7,115,316 B1
(45) Date of Patent: Oct. 3, 2006

(54) ANTI-TELESCOPING ADHESIVE TAPE PRODUCT

(75) Inventors: Brian A. Vulpitta, Avon Lake, OH (US); Marc van Cromvoirt, Abraham Kuyperstraat (NL)

(73) Assignee: Henkel Kommanditgesellschaft Auf Aktien, Duesseldorf (DE)

( * ) Notice: Subject to any disclaimer, the term of this patent is extended or adjusted under 35 U.S.C. 154(b) by 876 days.

(21) Appl. No.: 09/711,478

(22) Filed: Nov. 13, 2000

(51) Int. Cl.
*B32B 5/00* (2006.01)

(52) U.S. Cl. .................. 428/98; 428/34.1; 428/36.9; 428/40.1; 428/304.4; 428/317.1; 428/906; 242/610; 242/610.1; 242/610.3; 242/613.2; 242/613.1; 242/613; 221/70; 156/349

(58) Field of Classification Search ........... 428/40.1, 428/34.1, 36.9, 304.4, 317.1, 906, 98; 242/610, 242/613.1, 613, 610.1, 610.3, 613.2; 221/70; 156/349
See application file for complete search history.

(56) References Cited

U.S. PATENT DOCUMENTS

| 2,772,774 | A | * | 12/1956 | Rabuse ............. 242/160.1 |
| 3,179,245 | A | * | 4/1965 | Bastian, Jr. ........... 242/160.1 |
| 4,286,729 | A | * | 9/1981 | Downing ............... 221/70 |
| 4,907,696 | A | | 3/1990 | DeCoste, Jr. |
| 5,755,905 | A | | 5/1998 | Sinn et al. |
| 5,884,857 | A | * | 3/1999 | Martin-Cocher et al. 242/160.4 |
| 6,077,577 | A | | 6/2000 | Spatorico et al. |

FOREIGN PATENT DOCUMENTS

| EP | 0430548 | * | 5/1991 |
| JP | 156218 A | | 6/1993 |

OTHER PUBLICATIONS

Copy of a web page illustrating a Manco product identified as the One Touch brand tape product dated Oct. 4, 2000.
Supplementary European Search Report EP 01 98 8470.

* cited by examiner

*Primary Examiner*—Patrick Joseph Ryan
(74) *Attorney, Agent, or Firm*—Fay Sharpe Fagan Minnich & McKee; Thomas E. Young; Karl W. Hauber

(57) ABSTRACT

An adhesive tape product comprises a length of adhesive tape mounted on a core with a reduced tendency to telescope. A layer of compressible foam is provided between the core and the body of tape wound on the core. Alternatively, the core is fabricated to have a slight bulge in its center giving the core a barrel shape thereby reducing the tendency for the body of tape wound upon the core to telescope.

10 Claims, 2 Drawing Sheets

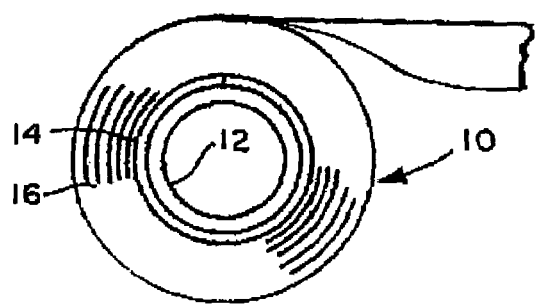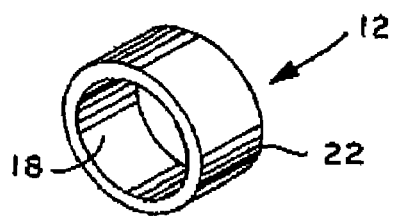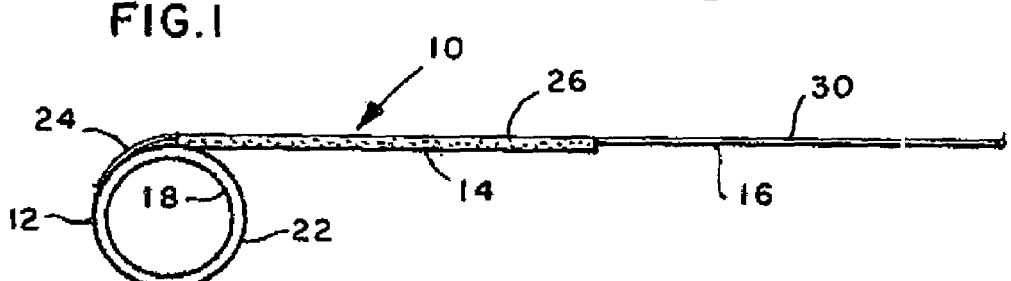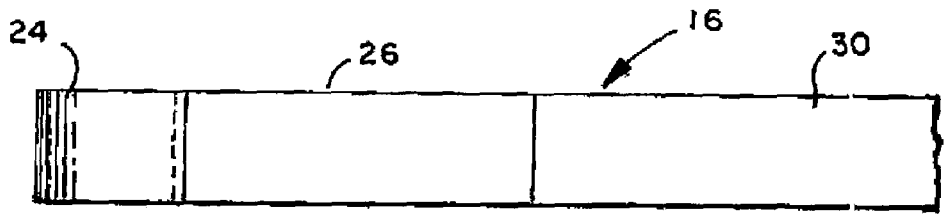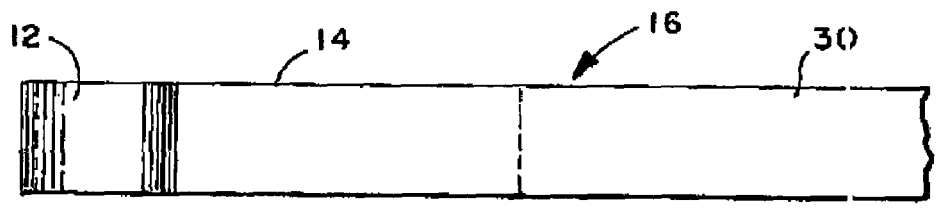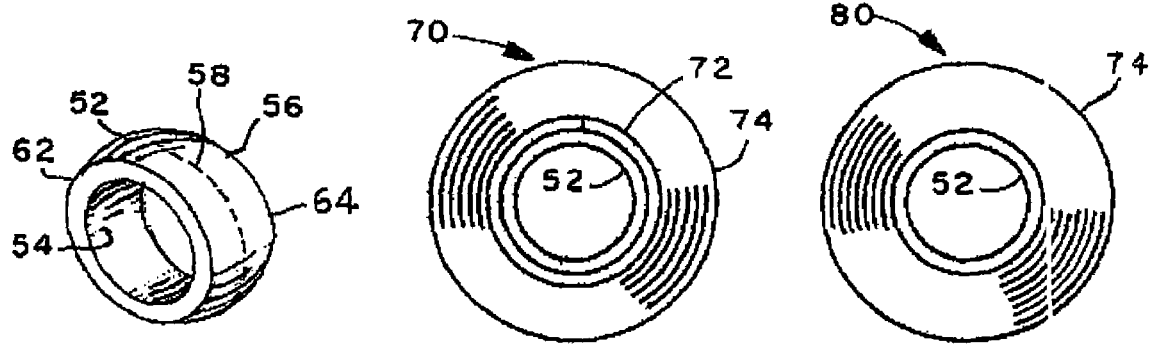
FIG. 1    FIG. 2    FIG. 3    FIG. 4    FIG. 5    FIG. 6    FIG. 7    FIG. 8

ANTI-TELESCOPING ADHESIVE TAPE PRODUCT

The present invention relates to adhesive tape products in which a body of adhesive tape, normally comprising an acetate or plastic film with adhesive on one or both sides, is wound upon a cylindrical tape core. The tape product is sold alone or as part of a dispenser and allows the user to have a body of tape in a convenient, compact form and dispense selected lengths from that tape product for use.

BACKGROUND OF THE INVENTION

Adhesive tape products, primarily pressure sensitive adhesive tape products, are used in a wide variety of applications. One particularly high volume application is household and stationery use, transparent adhesive tape, that is a transparent acetate or plastic film having an adhesive coated on one side, is used in offices and households in a number of applications. Such tapes come in various widths including ½ inch, ¾ inch, 1 inch, and 2 inches. Metric widths including 12 mm and 19 mm are also common. The transparent tape is often wound upon a cylindrical core. The core has a width generally equal to the width of the tape. The tape core often has one of several inside diameters including ½ inch, 1 inch and 3 inches. Various lengths of tape are wound upon these cores. Common tape lengths and are 300 inches to 36 yards. Lengths can be 60 yards and more.

The above-described adhesive tape products are sold in very large numbers and therefore must be manufactured in automated facilities producing a uniform high quality product.

One method of manufacturing such products is to create a broad long roll of adhesive coated film, slit this film to the appropriate width, and wind appropriate lengths of the slit film onto tape cores. Some cores are large diameter (3 inch) paper tubes upon which the length of tape is wound. Another core consists of two thin plastic coaxial cylinders spaced coaxially about ⅛ inch apart with a central thin axial wall connecting the two thin plastic cylinders. This double-walled plastic core is often seen as a one inch diameter core used with ¾ inch tape sold for use in the office or home environment.

One problem encountered with adhesive tape products of the type described is called "telescoping." In a roll of tape which suffers from telescoping, successive layers of the adhesive tape wound upon the core are displaced axially. Thus, the roll of tape takes on a generally conical shape rather than the cylindrical shape of a tape product not suffering from telescoping. A roll of tape suffering from a severe case of telescoping often cannot be mounted on a dispenser. Moreover, such a roll of tape has the edges of the adhesive of succeeding tape layers exposed and can pick-up dirt. A significantly telescoped adhesive tape product will be viewed as defective and not purchased.

Telescoping is more of a problem with narrow width tapes when compared to wider tapes. Telescoping is more of a problem on smaller diameter tape cores when compared to larger diameter tape cores.

Adhesive tape products are often used in dispensers. The adhesive tape wound upon a core must be easily loadable upon a dispenser and also operate smoothly when a consumer wishes to apply a length of tape from the dispenser to a workpiece.

Small size is sometimes an advantage with respect to adhesive tape products. Thus, smaller diameter cores are sometimes used in an effort to minimize overall package and dispenser size. The core in an adhesive tape product must work smoothly in such a small dispenser.

In addition to its function of holding tape to be dispensed in the retail package, the tape core also performs a function in the manufacturing operation creating the product. After a sheet of adhesive-coated film is slit into appropriate widths for tape, the slit films must be wound into a finished product. The film is generally wound upon the tape core. The tape core must cooperate with the manufacturing apparatus in a way which allows it pick up the leading edge of the slit film, and wind it onto the core itself into a uniform non-telescoped product.

There is a need for adhesive tape products which do not telescope especially in the smaller sizes.

SUMMARY OF THE INVENTION

The present invention contemplates a new and improved piece of tape product less prone to telescoping, especially in the smaller sizes, which is inexpensive to manufacture, operates smoothly with manufacturing equipment and operates smoothly in dispensers, especially in the smaller sizes.

In accordance with the present invention, an adhesive tape product comprises a hollow, generally cylindrical core surrounded by a compressible foam strip which is in turn surrounded by a length of adhesive tape.

Further in accordance with the invention, the total thickness of the foam strip surrounding the core is about 40 mils (1 mm).

Yet further in accordance with the invention, the principal foam strip completely surrounds the core in one turn and one turn only.

Yet further in accordance with the invention, an adhesive tape product comprises a tape core which is hollow and generally cylindrical with an outer surface bulging outwardly at its center whereby said tape core has a barrel shaped appearance and said tape core is wound with a length of tape forming an adhesive tape product.

Still further in accordance with the invention, an adhesive tape product is provided comprising a barrel shaped tape core surrounded by a layer of foam material which is in turn surrounded by a body of adhesive tape wound in several windings around said tape core and foam strip.

It is the principal object of the present invention to provide a new and improved adhesive tape product which is inexpensive to manufacture, operates smoothly with dispensers, and has a low tendency to telescope.

It is another object of the present invention to provide an adhesive tape product having a very small tape core, carrying a relatively large amount of tape yet having a low tendency to telescope.

It is still another object of the present invention to provide an adhesive tape product which will have a low tendency to telescope yet which will operate smoothly in small hand-held dispensers.

These and other objects and advantages of the present invention will become apparent from the following detailed description of the preferred embodiments thereof and from the accompanying drawings in which:

FIG. 1 is a side elevation view of an adhesive tape product in accordance with the present invention;

FIG. 2 is a perspective view of the tape core seen in FIG. 1;

FIG. 3 is a side elevation view of the adhesive tape products seen in FIG. 1 fully unwound showing the core and inner end of the tape product only;

FIG. 4 is a top view of the tape product seen in FIG. 3;

FIG. 5 is a bottom view of the tape product seen in FIG. 3;

FIG. 6 is a perspective view of an alternative tape core usable in the present invention;

FIG. 7 is a side elevation view of an adhesive tape product using the tape core seen in FIG. 6;

FIG. 8 is a side elevation view of a second adhesive tape product in accordance with the present invention using the tape core of FIG. 6;

DESCRIPTION OF PREFERRED EMBODIMENTS

Figure 9:
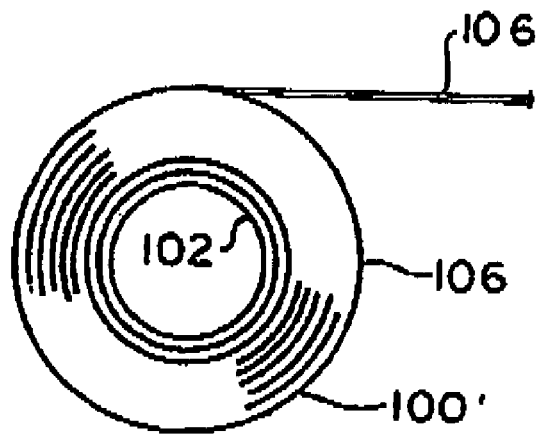
FIG. 9 is a side elevation view of an adhesive tape product in accordance with another embodiment of the present invention.

Referring to the drawings wherein the showings are for the purposes of illustrating preferred embodiments of the invention and not for the purpose of limiting same, FIG. 1 showed a front elevation view of an adhesive tape product 10 in accordance with the present invention. A tape core 12 is surrounded by a foam layer 14 which is in turn surrounded by a multitude of turns of adhesive tape 16. Referring to FIG. 2, the tape core 12 also seen in FIG. 1 is shown isolated from the other elements of the invention. The tape core is approximately 0.5 inch (12 mm) wide and is a hollow cylinder. The inside diameter of the cylinder is approximately 0.5 inch (12 mm) and the outside diameter of the cylinder is approximately 0.64 inch (16 mm). The inside surface 18 of the core is generally cylindrical, continuous and smooth. The outside surface of the core 22 is likewise generally cylindrical, continuous and smooth. The edges where the outside surface 22 and the inside surface 18 meet the ends of the cylinder are radius providing a non-sharp corner. The tape core 12 is solid and sized and finished to work reliably with small tape dispensers such as that available from Manco, Inc. of Avon, Ohio.

FIG. 3 shows the elements of the adhesive tape product 10 completely unrolled. The adhesive tape 16 (not shown in its entirety) is in excess of 30 feet long. The first portion of the adhesive tape 16 is a leader portion 24 which adheres directly to the outside surface 22 of the tape core 12. The leader is about 0.7 inches (18 mm) long. Immediately following the leader, is a foam support portion of the tape 26. The foam support portion of the tape is adhered to the foam layer 14. The foam support portion 26 for use with the ½ inch tape core described above is approximately 2.24 inches (57 mm) in length. This provides for one complete turn immediately adjacent the tape core 12 as seen in FIG. 1. Of course, for different size tape cores, different length foam support portions 26 would be used. Immediately adjacent the foam support portion of the tape 26 is the usable tape portion 30. The usable tape portion is the portion of the tape available for use by the consumer and, in the side illustrated in the drawings is in excess of 33 feet (10 meters) long.

The foam layer 14 is the same width as the adhesive tape 16 and the same length as the foam support portion 26 of the adhesive tape 16. The foam layer 14 is approximately 40 mils (1 mm) thick and is compressible. Any foam material which is chemically stable with the adhesive tape 16 and is compressible is appropriate.

The leader portion 24, foam support portion 26 and usable tape portion 30 of the adhesive tape 16 are all part of a continuous strip of adhesive tape having a uniform width and characteristics. Adhesive is applied over one entire side of the adhesive tape 16 including the leader portion 24, the foam support portion 26 and the usable tape portion 30. The foam layer 14 can be either completely non-adhesive or slightly adhesive without interfering with its ability to prevent telescoping. Printing can be placed upon the adhesive tape 16 on any of the three portions as desired. Alternatively, all three portions or selected ones of the three portions, leader 24, foam support 26, and usable tape portion 30, can be left transparent, colored or otherwise decorated.

FIG. 4 illustrates a top view of the unwound tape product as seen in FIG. 3 showing the continuous nature of the adhesive tape 16 and its three portions, the leader portion 24, the foam support portion 26, and the usable tape portion 30. FIG. 5 is a bottom view of the unrolled tape as seen in FIG. 3 and illustrates the placement of the foam layer 14 on the adhesive tape 16.

The adhesive tape product 10 is manufactured by winding the adhesive tape 16 with the foam layer 14 attached on the core 12. The leader 24 first contacts the outside surface 22 of the core 12 and is adhered to the core 12. The foam layer 14 next engages the outside surface 22 of the core 12 and is wound one complete turn around the core 12. This results in the core 12 being surrounded by the foam layer 14 as seen in FIG. 1. The usable tape portion 30 is then wound around the foam layer 14. The usable tape portion 30, being significantly longer than the other portions, requires a multitude of turns around the tape core, usually in excess of 100. Winding of the tape upon the core must be performed quickly in order to produce an economically attractive product. Tension is used in this winding process. This tension can vary from product to product and within a particular product as the tape progresses from small turns near the core to larger turns near the end of the usable tape portion 33. This tension may induce forces which encourages telescoping. Applicant has found that the application of a layer of foam as described above counteracts the tendency to telescope and significantly lessens the tendency of the tape product to telescope at the time of manufacture or thereafter.

An alternate tape core 52 usable in the invention is shown in FIG. 6. The alternate tape core 52 has a generally smooth continuous cylindrical inside surface 54. The alternate tape core 52 has a outside surface 56 which is generally smooth, continuous and somewhat barrel-shaped. The axial center 58 of the outside surface 56 is somewhat larger in diameter than the axial ends 62, 64 of the alternate tape core 52. The central swelling is very slight. For example, the outer diameter of the tape core 52 at the axial center may be 0.66 inches (16.75 mm) and the outside diameter of the tape core 52 at the axial ends 62, 64 may be 0.62 inches (15.75 mm). The outside surface 56 is generally smooth and continuous providing a very gentle barrel shape. This barrel-shaped tape core can be used as an element of tape product 70 incorporating the alternate core 52, a 40 mils (1 mm) foam layer 72, and a long length of adhesive tape 74 as seen in FIG. 7. It has also been found that the alternate tape core 52 can be wound directly with an adhesive tape 72 to form an adhesive tape product 80. The barrel-shaped alternate tape core 52 provides increased resistance to telescoping even without use of the foam layer 72.

Figure 10:
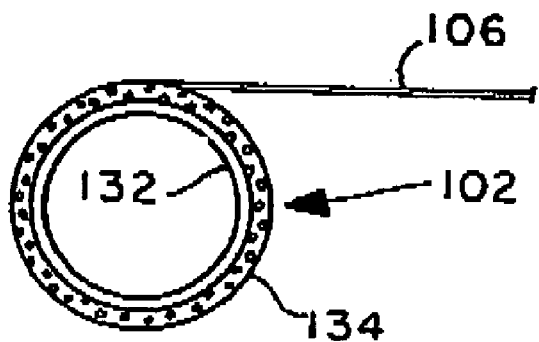
FIG. 10 is an enlarged cross-sectional view of a tape core seen in FIG. 9 with the end portion of the tape still attached to the tape core; and, FIG. 11 is a further enlarged segment of the tape core seen in FIG. 10.
Figure 11:
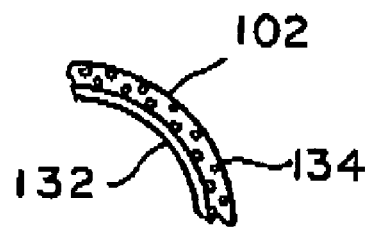

Another embodiment of the invention is shown in FIGS. 9, 10 and 11. An adhesive tape product 100 comprises a cylindrical tape core 102 and a length of adhesive tape 106.

The tape core is shown enlarged in FIG. 10. A segment of the tape core is shown further enlarged in FIG. 11. The tape core 102 comprises an inner solid layer 132 and an outer foam layer 134. The inner solid layer 132 has a smooth, hard cylindrical inner surface which will operate well with tape dispensers. The outer foam layer 134 is somewhat compressible and performs the same function as the foam layer 14 seen in the first embodiment of the invention. The outer foam layer in the embodiment of FIGS. 9–11 however is part of the tape core. This can be achieved by overmolding a foam layer onto a solid cylindrical inner layer 132. Alternatively, the foam layer 134 can be a foam tube slid onto a solid core. The foam layer 134 can be created by other means in which a plastic is extruded or otherwise formed into a cylindrical shape and differentiates into a solid inner portion 132 and a compressible foam outer portion 134.

The tape core illustrated in FIGS. 10 and 11 is advantageous in that the manufacturing process used to apply the tape 106 to the core can be identical to that used with prior art tape products. There is no need for application of a foam strip to the tape core in the winding process. The foam layer is already part of the tape core assembly upon which the tape is wound.

The invention has been described with reference to preferred embodiments. Moreover, the invention has been described with one particular size of tape product as illustrative. The invention is useful in other size adhesive tape products but appears to have most benefit with small core diameter, long narrow tape products. Obviously changes in size, other modifications and other alternations will occur to others upon the reading and understanding of the specification. It is intended to include all such modifications and alterations insofar as they come within the scope of the appended claims or the equivalents thereof.

Having thus described the invention, it is so claimed:

1. An anti-telescoping adhesive tape product comprising:
    a hollow cylindrical core having a diameter and a width and an outer surface;
    a length of adhesive tape having a uniform width and a length substantially greater than said width wound in several turns about said core said length of tape comprising a leader portion fixed to said core, a foam support portion and a usable tape portion;
    said foam support portion positioned after the leader portion and before said usable tape portion; and,
    a compressible foam strip fixed to said tape foam support portion.

2. The adhesive tape product of claim 1, wherein said foam strip is 40 mils (1 mm) thick.

3. The adhesive tape product of claim 1, wherein said foam strip surrounding said core has a total thickness of 40 mils (1 mm).

4. The adhesive tape product of claim 1, wherein said foam strip surrounds said core in a single layer and said foam strip is 40 mils (1 mm) thick.

5. The adhesive tape product of claim 1, wherein said core comprises a thin solid tubular wall.

6. The adhesive tape product of claim 1, wherein said core has an outer surface bulging outwardly near the core's axial center giving said core a barrel shape.

7. An anti-telescoping adhesive tape product comprising:
    a tape core having an axial width, said core being hollow with a solid outer wall, said outer wall having an outer surface which bulges outwardly at its axial center giving said core a barrel shape;
    a compressible foam strip surrounding said core; and,
    a length of adhesive tape having a uniform width and a length substantially greater than said width, a first portion of said tape adhering to said core, and a useable tape portion wound in several turns about said core and said foam strip wherein the length of tape comprising a leader portion fixed to the core, a foam support position and a usable tape portion, the foam support portion positioned after the leader portion and before the usable tape portion; and a compressible foam strip fixed to the tape foam support portion.

8. The adhesive tape product of claim 7, wherein said foam strip is 40 mils (1 mm) thick.

9. The adhesive tape product of claim 8, wherein said foam strip has a width approximately equal to said adhesive tape width and surrounds said core in a single layer.

10. An anti-telescoping adhesive tape product comprising:
    a tape core having an axial width, said core being hollow with a solid outer wall, said outer wall having an outer surface which bulges outwardly at its axial center giving said core a barrel shape;
    a compressible foam strip;
    a length of adhesive tape directly attached to said core and wherein said foam strip is directly attached to said length of said adhesive tape; and, wherein the length of tape comprising a leader portion fixed to the core, a foam support position and a usable tape portion, the foam support portion positioned after the leader portion and before the usable tape portion; and a compressible foam strip fixed to the tape foam support portion.

* * * * *

UNITED STATES PATENT AND TRADEMARK OFFICE
CERTIFICATE OF CORRECTION

| | | |
|---|---|---|
| PATENT NO. | : 7,115,316 B1 | Page 1 of 1 |
| APPLICATION NO. | : 09/711478 | |
| DATED | : October 3, 2006 | |
| INVENTOR(S) | : Brian A. Vulpitta et al. | |

It is certified that error appears in the above-identified patent and that said Letters Patent is hereby corrected as shown below:

Column 6, Line 23-24

Change "a foam support position" to --a foam support portion--

Column 6, Line 43

Change "a foam support position" to --a foam support portion--

Signed and Sealed this

Eleventh Day of September, 2007

JON W. DUDAS
*Director of the United States Patent and Trademark Office*